United States Patent
Morris et al.

(10) Patent No.: US 11,010,279 B2
(45) Date of Patent: May 18, 2021

(54) METHOD AND SYSTEM FOR IMPLEMENTING A BUILD VALIDATION ENGINE

(71) Applicant: JPMorgan Chase Bank, N.A., New York, NY (US)

(72) Inventors: Christopher C. Morris, West Reading, PA (US); Daryl Te, Norristown, PA (US)

(73) Assignee: JPMORGAN CHASE BANK, N.A., New York, NY (US)

(*) Notice: Subject to any disclaimer, the term of this patent is extended or adjusted under 35 U.S.C. 154(b) by 42 days.

(21) Appl. No.: 16/288,881

(22) Filed: Feb. 28, 2019

(65) Prior Publication Data

US 2020/0278918 A1 Sep. 3, 2020

(51) Int. Cl.
  *G06F 11/36* (2006.01)
(52) U.S. Cl.
  CPC ...... *G06F 11/3664* (2013.01); *G06F 11/3608* (2013.01)
(58) Field of Classification Search
  CPC .......... G06F 11/3664; G06F 11/3608
  See application file for complete search history.

(56) References Cited

U.S. PATENT DOCUMENTS

| | | | | |
|---|---|---|---|---|
| 6,195,795 B1* | 2/2001 | Block | ............ | G06F 8/71 707/999.203 |
| 7,519,953 B2* | 4/2009 | Reissman | ............ | G06F 11/3672 717/124 |
| 7,760,769 B1* | 7/2010 | Lovett | ............ | G06F 11/3656 370/535 |
| 8,037,453 B1* | 10/2011 | Zawadzki | ............ | G06F 11/368 717/107 |
| 8,127,268 B2* | 2/2012 | Fernandez-Ivern | | G06F 11/3664 717/101 |
| 8,661,427 B2* | 2/2014 | Hoff | ............ | G06F 8/61 717/168 |

(Continued)

OTHER PUBLICATIONS

Phillips et al., "Understanding and Improving Software Build Teams" (Year: 2014).*

(Continued)

*Primary Examiner* — Phillip H Nguyen
(74) *Attorney, Agent, or Firm* — Hunton Andrews Kurth LLP

(57) ABSTRACT

The invention relates to a build validation engine for a software build process. According to an embodiment of the present invention, a computer implemented system a build validation engine further configured to perform the steps comprising: receiving inputs from a software platform, the inputs comprising a build identifier and a mode indicator; initiating, via the build validation engine, validation of a plurality of configuration file categories for a software build; identifying and applying, via the build validation engine, a set of configuration rules, the set of configuration rules associated with each configuration file category and further comprising server class validation, inputs validation, indexes validation and props validation; and determining whether a successful build is achieved and if a successful build is not determined, failing the build and deleting corresponding deployment bundles.

18 Claims, 5 Drawing Sheets

(56) References Cited

U.S. PATENT DOCUMENTS

| | | | | |
|---|---|---|---|---|
| 9,021,443 B1* | 4/2015 | Lachwani | ............ | G06F 11/3688 717/124 |
| 9,563,450 B1* | 2/2017 | Totale | ................ | G06F 9/44589 |
| 10,289,539 B1* | 5/2019 | Arguelles | ............ | G06F 11/3692 |
| 2006/0015839 A1* | 1/2006 | Owens | ...................... | G06F 8/20 717/100 |
| 2007/0006041 A1* | 1/2007 | Brunswig | ............ | G06F 11/3688 714/38.14 |
| 2007/0006122 A1* | 1/2007 | Bailey | ....................... | G06F 8/61 717/101 |
| 2007/0220479 A1* | 9/2007 | Hughes | ................. | G06Q 30/02 717/100 |
| 2008/0127093 A1* | 5/2008 | Fernandez-Ivern | ....... | G06F 8/71 717/124 |
| 2011/0016202 A1* | 1/2011 | Ye | ....................... | H04L 41/0869 709/222 |
| 2014/0282421 A1* | 9/2014 | Jubran | ................ | G06F 11/3688 717/126 |
| 2015/0052596 A1* | 2/2015 | Ayanam | ................... | H04W 4/38 726/8 |
| 2015/0227452 A1* | 8/2015 | Raghavan | ............ | G06F 11/3684 717/124 |
| 2016/0036858 A1* | 2/2016 | Chieu | ..................... | H04L 67/10 726/1 |
| 2016/0274906 A1* | 9/2016 | Srinivasan | ................ | G06F 8/60 |
| 2018/0285247 A1* | 10/2018 | Gandhi | ............... | G06F 11/3668 |

OTHER PUBLICATIONS

Shen et al., "ALMMA operation support software and infrastructure" (Year: 2012).*

Rodriguez et al., "A Tool for Optimizing Software Build and Release Process" (Year: 2011).*

Decker Roman, "Comparison of Configuration File Parsers and Systems" (Year: 2014).*

Kolla et al., "Pushing Configuration Bundles in an Indexer Cluster" (Year: 2017).*

James Miller, "Implementing Splunk 7" (Year: 2018).*

John S. Carson, "Model Verification and Validation" (Year: 2002).*

Lu et al., "CoSMIC: An MDA Tool Suite for Application Deployment and Configuration" (Year: 2003).*

* cited by examiner

METHOD AND SYSTEM FOR IMPLEMENTING A BUILD VALIDATION ENGINE

FIELD OF THE INVENTION

The present invention generally relates to validating configuration files for a software build.

BACKGROUND OF THE INVENTION

Currently, build jobs simply create deployment files that are in a software versioning and revision control system, such as Subversion (SVN) or Bitbucket. Any issues with the configuration will not be known until the bundle is deployed to a running application. Certain configuration issues may be very harmful and cause instability to the environment. In such systems, configuration files may be syntactically invalid and cause the product to crash or have significant run time errors.

These and other drawbacks exist.

SUMMARY OF THE INVENTION

Accordingly, one aspect of the invention is to address one or more of the drawbacks set forth above. According to an embodiment of the present invention, a computer implemented system implements a build validation engine. The system comprises: a real-time data interface that accesses a real-time data; an interactive user interface that displays build results via a communication network; and a build validation engine, coupled to the real-time data interface and the interactive user interface, the build validation engine further configured to perform the steps comprising: receiving inputs from a software platform, the inputs comprising a build identifier and a mode indicator; initiating, via the build validation engine, validation of a plurality of configuration file categories for a software build; identifying and applying, via the build validation engine, a set of configuration rules, the set of configuration rules associated with each configuration file category and further comprising server class validation, inputs validation, indexes validation and props validation; and determining whether a successful build is achieved and if a successful build is not determined, failing the build and deleting corresponding deployment bundles.

According to another embodiment of the present invention, a computer implemented method that implements a build validation engine. The method comprises the steps of: receiving inputs from a software platform, the inputs comprising a build identifier and a mode indicator; initiating, via a build validation engine, validation of a plurality of configuration file categories for a software build; identifying and applying, via the build validation engine, a set of configuration rules, the set of configuration rules associated with each configuration file category and further comprising server class validation, inputs validation, indexes validation and props validation; and determining whether a successful build is achieved and if a successful build is not determined, failing the build and deleting corresponding deployment bundles.

The computer implemented system, method and medium described herein provide unique advantages to entities, organizations and other users (e.g., developers, quality assurance teams, testing departments, etc.), according to various embodiments of the invention. An embodiment of the present invention is directed to creating and implementing a configuration validator for a product that lacks one. For example, the system may detect errors in the configuration before they are deployed to a distributed environment where any undetected error could cause a large multimode cluster to fail and require extensive manual correction. These and other advantages will be described more fully in the following detailed description.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DESCRIPTION OF EMBODIMENTS OF THE INVENTION

Figure 1:
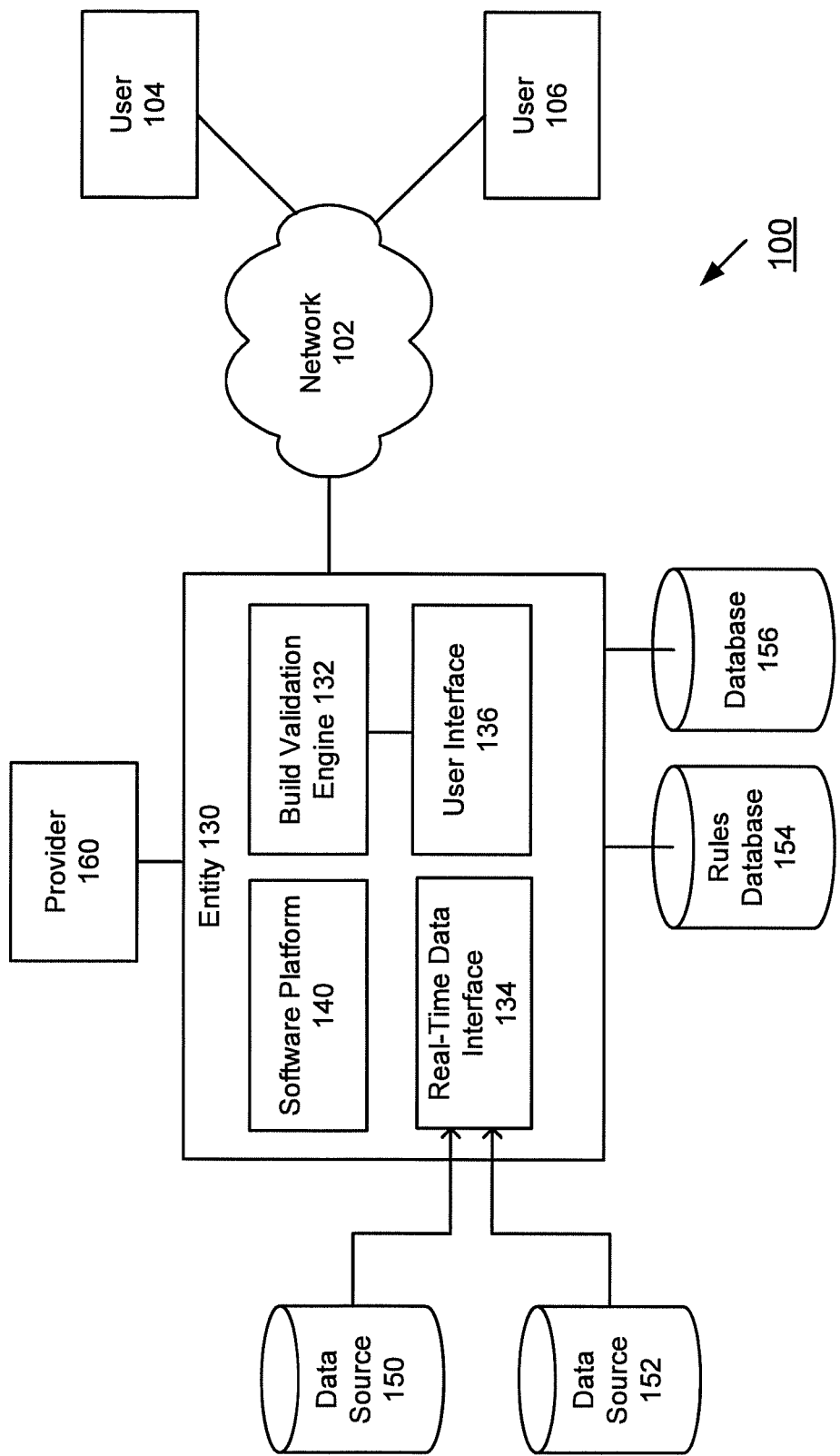
FIG. 1 is an exemplary system diagram for implementing a Build Validation Engine, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to a Build Validation Engine that implements a validation process for configuration files based on rules. The rules may address configuration issues including formatting, syntax and/or other vendor requirements and system preferences. The Build Validation Engine of an embodiment of the present invention addresses potential issues that if pushed to production or any environment could propagate across a distributed environment thereby causing serious issues, inefficiencies, outages and system crashes.

Configuration issues may include formatting and syntax issues, e.g., proper use of brackets, parenthesis and/or other symbols. For example, every stanza may be expected to include an open bracket followed by key words and followed by a closing bracket. In this scenario, if a build is passed with a missing closing bracket, the entire application may crash. According to an embodiment of the present invention, the validation process may detect whether a closing bracket is missing from the configuration file. Also, the system may expect configuration items to follow a format for a key value pair. For example, the system may only recognize the term "password" instead of "PW" or "Password" or "P word" or other variations.

According to another example, the Build Validation Engine may apply various rules, including syntax rules, input rules, output rules, parsing rules, user rules and customized rules as well. These rules may be based on external requirements, e.g., rules may be dictated by a vendor and/or other external source. Rules may also include business rules and practices. This may be company or entity specific preferences. Rules may be enforced for manageability and administration reasons. In addition, rules may be applied to certain naming standards and may further relate to parameters, values, character type, length, etc. For example, a parameter may require a value that includes number(s), letter, string, true/false, zero/one and/or other value or value set.

An embodiment of the present invention is directed to developing a series of scripts for static analysis and a testing framework to validate configuration entries for various types of configuration files. According to an exemplary embodiment, a Build Validation Engine may be applied to Splunk configuration files. Splunk represents a software platform to search, analyze and visualize the machine-generated data gathered from the websites, applications, sensors and various other devices that make up an IT infrastructure and business. Other software platforms may be integrated with the Build Validation Engine of the present invention. In this example, configuration files may include indexes.conf, inputs.conf, props.conf, transforms.conf, and limits.conf. According to an exemplary application, Indexes.conf is to configure Splunk's indexes and their properties. Inputs.conf contains settings to configure inputs, distributed inputs such as forwarders, and file system monitoring in inputs.conf. Props.conf contains possible setting/value pairs for configuring Splunk software's processing properties. Transforms.conf contains settings and values to configure data transformations. Limits.conf contains setting to configure limitation for the search. The Build Validation Engine may be extendable to validate configuration files and the settings they contain.

Validations may be specific to requirements and/or preferences including syntax, practices and style. For example, syntax may refer to making sure the keywords used align with the expected keywords for that configuration file and values are valid. Practices may refer to validating conf files have best practice configuration settings, which may be predetermined. Style may confirm that specific naming schemes and character sets are used to enhance reporting and promote consistency.

When integrated into a continuous integration tool (e.g., Jenkins), developers and other users may receive feedback regarding the quality of their build and whether the build may be safely deployed to production. Jenkins represents a server that automates the software development process with continuous integration and further facilitates technical aspects of continuous delivery. Other automation servers may be integrated with an embodiment of the present invention.

Currently, any issues with the configuration will not be known until the bundle is deployed to a running application (e.g., development, user acceptance testing, stage, production, etc.). Certain configuration issues may be very harmful and cause instability to the environment. To reduce and/or minimize invalid configurations to be deployed, an embodiment of the present invention is directed to enhancing the build job to perform static validation of various types of configuration files. The innovative validation may ensure the syntax of the configuration files is correct and thus deploying it will not harm the environment.

An embodiment of the present invention may apply a learning algorithm where rules may be fine-tuned and customized for various applications, objectives as well as other considerations. Accordingly, the system of an embodiment of the present invention may automatically and/or iteratively revise rules and/or provide suggestions to revise rules to achieve efficiencies, optimization and/or other benefits in the build validation process.

FIG. 1 is an exemplary system diagram for implementing a Build Validation Engine, according to an embodiment of the present invention. As illustrated in FIG. 1, Network 102 may be communicatively coupled with one or more data devices including, for example, computing devices associated with end users, represented by User 104, 106. Such devices may include computers, laptops, and mobile devices, including mobile phones, smart devices, etc. Entity 130 may include a Build Validation Engine 132 that validates configuration files in accordance with the various embodiments of the present invention. Build Validation Engine 132 may process various validation types including serverclass.conf, inputs.conf, indexes.conf, and props.conf. Build Validation Engine 132 may also incorporate modules, interfaces and/or other features, such as User Interface 136. Entity may also include Software Platform 140 and Real-Time Data Interface 134. These modules are exemplary and illustrative, Entity 130 may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

Build Validation Engine 132 may implement various rules stored and maintained by Rules Database 154. For example, Rules Database 154 may maintain application specific rules and corresponding values. Rules may relate to syntax, practices and styles, for example. Database 156 may store and maintain output data in various formats as well as reports, performance data, etc. Database 156 may maintain and store configuration files and/or other associated data. The Build Validation Engine described herein may be provided by Entity 130 and/or a third party provider, represented by 160, where Provider 160 may operate with Entity 130.

Real-Time Data Interface 134 may receive machine data from various sources represented by 150 and 152. Software Platform 140 may represent a software platform it that searches, analyzes and visualizes machine-generated data gathered from various sources. Software Platform 140 may be integrated with the Build Validation Engine of the present invention. Software Platform 140 may communicate with Build Validation Engine 132 via an Application Programming Interface (API) or other interface.

The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 is depicted, it should be appreciated that other connections and relationships are possible. The system 100 described below may be used to implement the various methods herein, by way of example. Various elements of the system 100 may be referenced in explaining the exemplary methods described herein.

Network 102 may be a wireless network, a wired network or any combination of wireless network and wired network. Network 102 may utilize one or more protocols of one or more network elements to which it is communicatively coupled. Network 102 may translate to or from other protocols to one or more protocols of network devices. Although Network 102 is each depicted as one network for simplicity, it should be appreciated that according to one or more embodiments, Network 102 may comprise a plurality of interconnected networks, such as, for example, a service provider network, the Internet, a cellular network, corporate networks, or even home networks, or any of the types of networks mentioned above. Data may be transmitted and received via Network 102 utilizing a standard networking protocol or a standard telecommunications protocol.

Entity 130 may be communicatively coupled to Data Sources 150, 152, via Real-Time Data Interface 134. These storage components may include any suitable data structure to maintain the information and allow access and retrieval of the information. For example, the storage components may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

The storage may be local, remote, or a combination. The storage components may have back-up capability built-in. Communications with the storage components may be over a network, such as Network 102, or communications may involve a direct connection between the various storage components and Entity 130, as depicted in FIG. 1. The storage components may also represent cloud or other network based storage.

Figure 2:
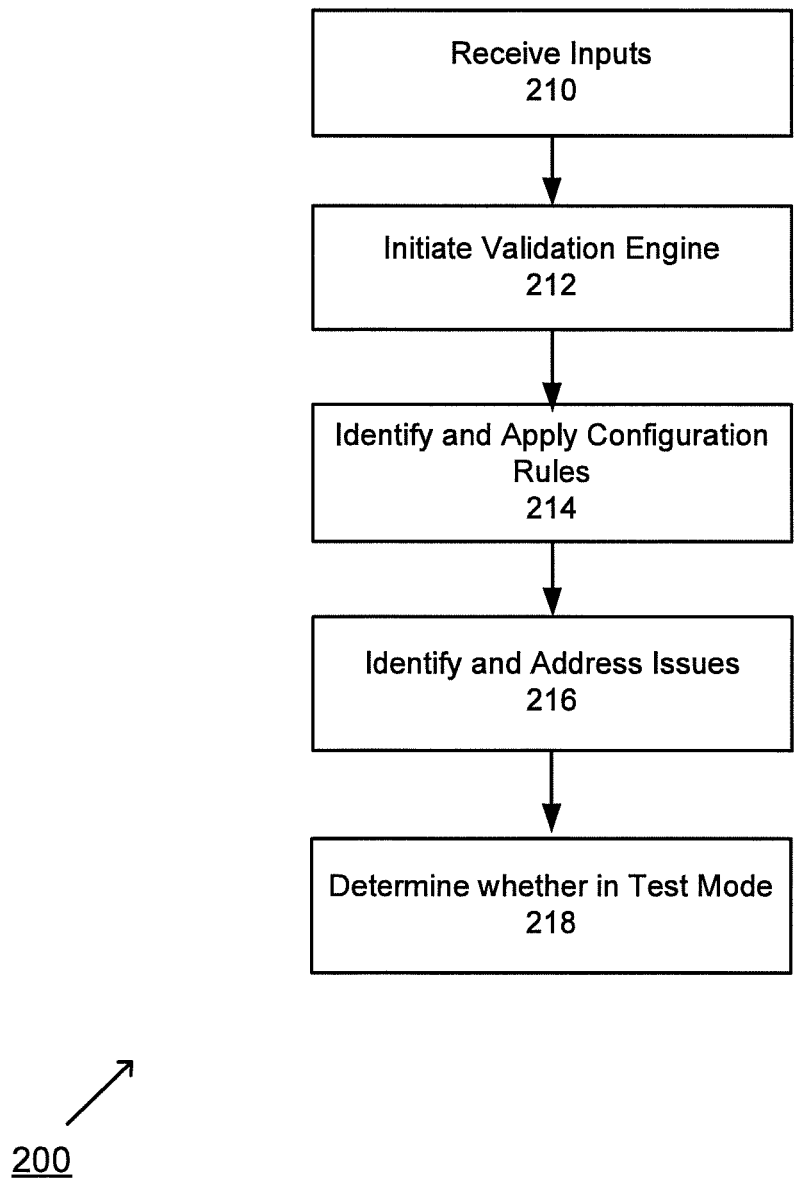
FIG. 2 is an exemplary flowchart for implementing a Build Validation Engine, according to an embodiment of the present invention.

FIG. 2 is an exemplary flowchart for implementing a Build Validation Engine, according to an embodiment of the present invention. According to an embodiment of the present invention, a validation script may reside and/or execute on a master build server. According to an exemplary embodiment, the validation script may be represented as a Korn shell, Unix shell or other command execution program or command interpreter. At step 210, the system may receive inputs. The script may receive inputs from the software application (e.g., the Splunk app), build number (or identifier) and a mode indicator (e.g., a TEST mode) as input arguments. At step 212, a validation engine may be initiated. It may perform an initialization and then call one or more main validation components, such as serverclassValidation, inputs Validation, indexValidation, propsValidation. At step 214, the system may identify configuration issues via an interactive user interface. At step 216, the system may identify and/or address the issues. Upon identifying a validation failure, corresponding build bundles may be deleted and then exit as a failure. At step 218, the system may determine whether the build is in test mode. For example, the script may also allow for a TEST mode. In TEST mode, detected failures may be noted and validation may continue. If test mode is determined, failures may be displayed. This may involve revising the configuration files, deleting and continuing the validation process. If test mode is not determined, the build may be considered a failure and then deleted. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. The details of the steps are described below.

Figure 3:
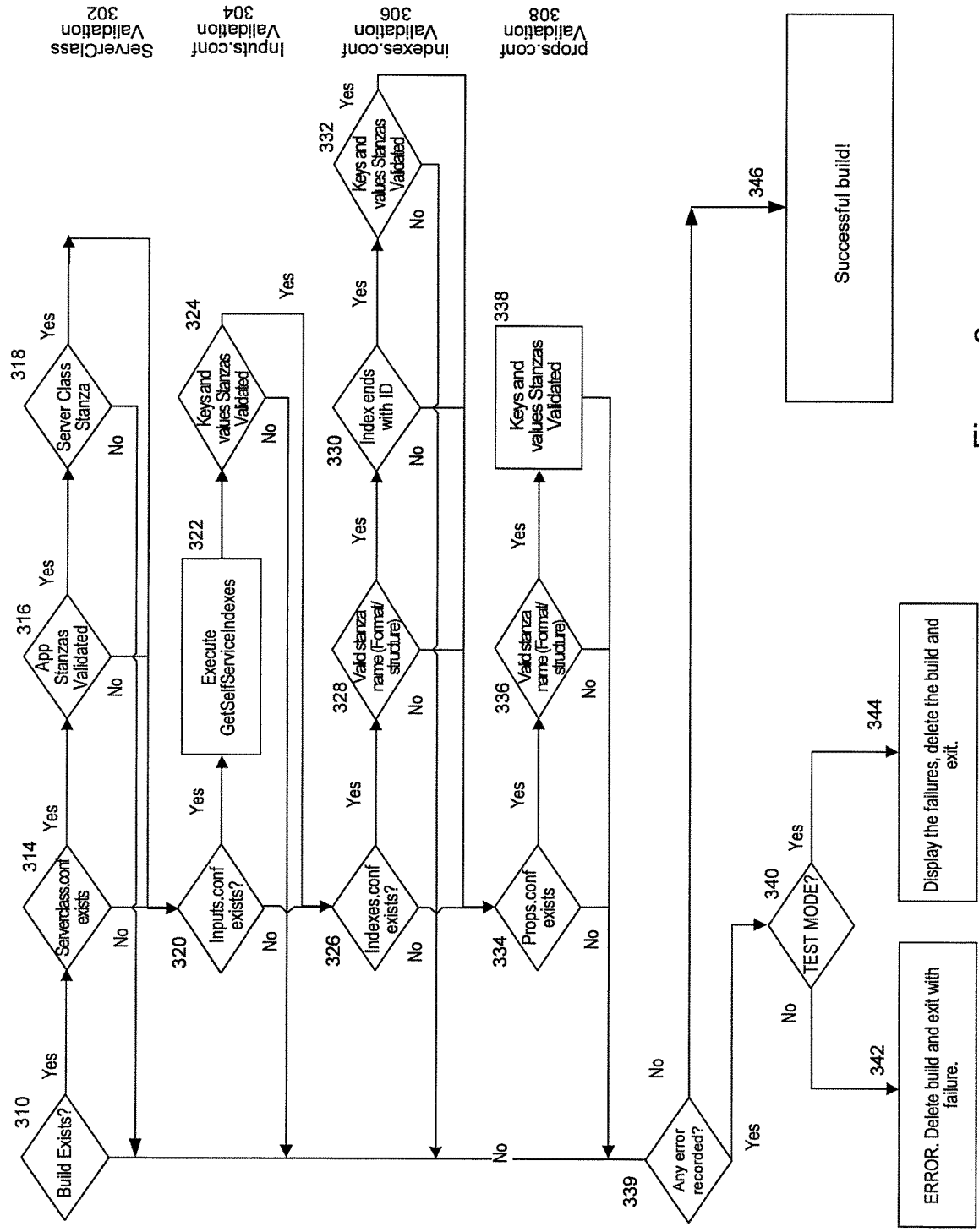
FIG. 3 is an exemplary flowchart for implementing a Build Validation Engine, according to an embodiment of the present invention.

FIG. 3 is an exemplary flowchart for implementing a Build Validation Engine, according to an embodiment of the present invention. FIG. 3 illustrates four exemplary stages—ServerClass Validation 302, Inputs Validation 304, Indexes Validation 306 and Props Validation 308 Other types of validations may be applied. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed. The details of the steps are described below.

At step 310, the system may determine whether a build exist. If a build does not exist, the process proceeds to step 339 to determine whether any errors are recorded. If no errors, a build is deemed successful at step 346. If errors are recorded, the process proceeds to step 340 to determine whether a test mode is applicable. If in TEST mode, the process displays all the error messages and exists as failed build. If in normal mode, the process deletes the build bundle and exits as a failure.

According to an embodiment of the present invention, each configuration file may include a check for invalid characters. For example, for each of step 314, 320, 326 and 334, the process may determine whether invalid characters exist. If there are no invalid characters, the process proceeds to the next step. If invalid characters are detected, the process may determine whether in test mode. If yes, the process may determine whether there are any errors recorded. This process may be applied for each configuration file, e.g., steps 314, 320, 326 and 334.

The process proceeds to determine whether ServiceClass-.Conf file exists at step 314. If serverclass.conf does not exist, the process continues to step 320. If serverclass.conf exists, the process proceeds to determine whether App Stanzas have been validated at step 316. This may involve validating stanza name structure and/or format. For example, a valid stanza may be represented as serverClass: <svr class name>:app:<app name>. This may also involve validating keys and values. For example, restartSplunk-Web—value must be true or false. restartSplunkd—value must be true or false. stateOnClient—value must be enabled, disabled or noop. This may also involve validating the (deployment) app exists and validating the server class is defined. The process proceeds to determine whether Server Class stanza exist at step 318. This may involve validating that whitelist/blacklist sequence numbers are in lexical order. If in TEST mode, the process notes/writes the error to a ValidationErr file and continues. The process proceeds to the Input Validation stage 304.

The process determines whether inputs.conf file exists at step 320. If inputs.conf does not exist, the process continues to step 326. If yes, the process checks for invalid characters. In this example, the process executes a GetSelfServiceIndexes build job at step 322. It then proceeds to determine whether App Stanzas have been validated at step 324. This may represent a build job to get the indexes defined in an indexes app, e.g., abc_indexes app. The process then determines whether keys and values Stanzas are validated. If yes, the process proceeds to the Indexes Validation stage 306.

Step 324 may involve validating stanza name structure/format as well as validating stanza keys and values. For an index, the process may validate that a key is defined and a value exists in an indexes.conf file. The process may further validate that a sourcetype key is defined and a value exists in props.conf. The process may grand-father existing sourcetypes not defined props.conf. Other representative keys and values may include the following: crcSalt—if exists have non-null value; followTail—if exists have 0 or 1 value; interval—if exists have non-null value; move_policy—if exists have sinkhole value and required for; source—if exists have non-null value; disabled—if exists have 0 or 1 value; blacklist—if exists have non-null value; whitelist—if exists have non-null value; connection_host—if exists have ip or dns or none value; ignoreOlderThan—if exists have non-null integer value; multiline_event_extra_waittime—if exists have true or false value; route—if exists have non-null value; _TCP_ROUTING—if exists have non-null value; time_before_close—if exists have an integer value.

The process determines whether indexes.conf file exists at step 326. If indexes.conf does not exist, the process continues to step 334. If indexes.conf exists, the process checks for invalid characters and proceeds to determine whether stanza name is valid in terms of format, structure, etc., at step 328. If yes, the process proceeds to determine whether an Index ends with an internal identifier or other identifier, at step 330. The process may grandfather existing index that do not end with the identifier. If yes, the process proceeds to determine whether keys and values Stanzas are validated, at step 332. Representative keys and values may include: coldPath; homePath; thawedPath; frozenTimePeriodInSecs; maxTotalDataSizeMB; maxDataSize. The process proceeds to the Props Validation stage 308. If in TEST mode, the process notes/writes the error to a ValidationErr file and continues.

The process then determines whether props.conf file exists at step 334. If props.conf does not exist, the process continues to step 339 for an error determination. If props.conf exists, the process checks for invalid characters and proceeds to determine whether stanza name is valid in terms of format, structure, etc., at step 336. If yes, the process proceeds to determine whether keys and values Stanzas are validated at step 338. Representative stanza keys and values may include: TIME_FORMAT—non-null value; Not all has this. SHOULD_LINEMERGE—value should be true or false; NO_BINARY_CHECK—should be true or false (true allow to process binary files); LINE_BREAKER/BREAK_ONLY_BEFORE—non-null value. MAX_TIMESTAMP_LOOKAHEAD—integer value. If in TEST mode, the process notes/writes the error to a ValidationErr file and continues. After completing validations the process continues to step 339.

At 339, the process determines whether any errors are recorded. If no errors, a build is deemed successful at step 346. If errors are recorded, the process proceeds to step 340 to determine whether a test mode is applicable. If in TEST mode, the process notes/writes the error to a file, such as a ValidationErr file, and continues. If in normal mode, the process deletes the build bundle and exits as a failure.

The process may review the validation results from the prior steps. If any error was recorded, the process continues to step 400 (in FIG. 4) for reporting and build disposition. If no errors were encountered, the process continues to step 346 for reporting.

If a test mode is determined at step 340, the system may display the identified failures, delete the build and exit, at step 344. For example, in a test mode, the error may be written to a ValidationErr file and then the process continues. If a test mode is not applicable, the system may identify an error and delete the build and exit with failures, at step 342.

Figure 4:
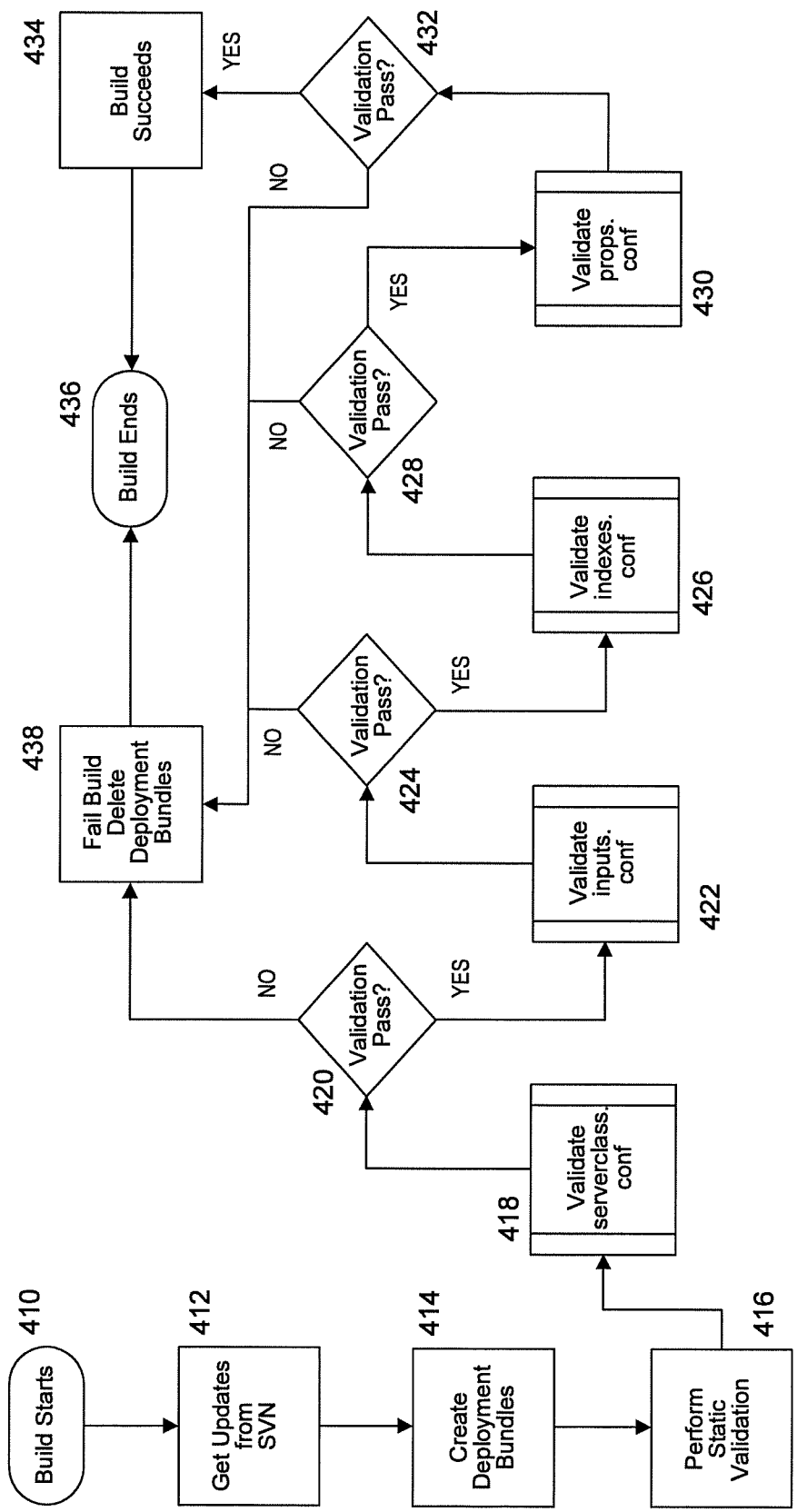
FIG. 4 is an exemplary flowchart for implementing a Build Validation Engine, according to an embodiment of the present invention.

FIG. 4 is an exemplary flowchart for implementing a Build Validation Engine, according to an embodiment of the present invention. At step 410, a build process starts. At step 412, updates may be received from software versioning and revision control system. At step 414, deployment bundles may be created. At step 416, static validation may be performed. At step 418, the process may validate serverclass.conf. If validation passes at 420, the process may validate inputs.conf at 422. If validation passes at 424, the process may validate indexes.conf at 426. If validation passes at 428, the process may validate props.conf at 430. If validation passes at 432, the build succeeds at 434. If a validation fails, then the process fails the build and deletes deployment bundles at 438. The build process then ends at 436. The validation process of FIG. 4 is merely exemplary. Other validation categories/classes may be applied. The order illustrated in FIG. 4 is merely exemplary. While the process of FIG. 4 illustrates certain steps performed in a particular order, it should be understood that the embodiments of the present invention may be practiced by adding one or more steps to the processes, omitting steps within the processes and/or altering the order in which one or more steps are performed.

In accordance with the various embodiments of the present invention, the Build Validation Engine may integrate with various platforms, applications, scripts, etc. Exemplary illustrations are provided below.

An embodiment of the present invention may include a BuildValidationEngine App. This build job may execute against itself in TEST mode. The validation may be done against test case configuration files stored in this app. The configurations may store known and/or accepted test cases. This app may contain the following representative files: BuildValidation.ksh; Serverclass.conf; Inputs.conf; Indexes.conf and Props.conf. For example, BuildValidation.ksh may represent a build validation engine script. Serverclass.conf may represent a test file to test various failure test cases against the serverclassValidation component/modules. Inputs.conf may represent a test file to test the various failure test cases against the inputsValidation component/modules. Indexes.conf may represent a test file to test the various failure test cases against the indexesValidation component/modules. Props.conf may represent a test file to test the various failure test cases against the propsValidation component/modules.

An embodiment of the present invention may also consider various exclusions. This may involve excluding various build jobs from the BuildValidation Engine.

An exemplary embodiment of the present invention may execute a GetSelfServiceIndexes build job. An index, such as abc_indexes, may contain indexes that are used by other Cluster Master (CM) build jobs. In this scenario, the build would fail, since the indexes defined there is built and thus exist on a slave server, e.g., a continuous integration tool server, Jenkins server. A Build Validation Engine may run on a main master server and may not have access to those files for validation. To overcome this, this build job may run on a master node where it points to abc_indexes repository. The repository may be associated with a software versioning and revision control system. This job may be similar to the original CM build job, but without creating deployment bundles. For example, this job may poll the software versioning and revision control system to download the latest abc_indexes code; prep/stage the (tarball) build directories. The validations may be performed against build directories of their respective app.

Currently Cluster Master (CM) build jobs simply get the latest code from a software versioning and revision control system (such as SVN) and create a deployment bundle. These build jobs may be modified to call the new Build Validation Engine script. It may pass in the splunk app and build number that is being build. The exit code from the build validation engine script may determine success or failure of the build.

Like the CM build jobs, SplunkDS-build may get the latest code from SVN creates a deployment bundle. However, it checks and reports (via electronic communication) on various issues, including, for example, if any are encountered: Sourcetypes defined in inputs.conf exists in props.conf or is grandfathered; Prod index ends with 5 digit identifier.

An embodiment of the present invention may further fail the build if a sourcetype check fails. An embodiment of the present invention may further execute a Build Validation Engine script, passing in the build job name and build number. The exit code from the build validation engine script may determine success or failure of the build.

Figure 5:
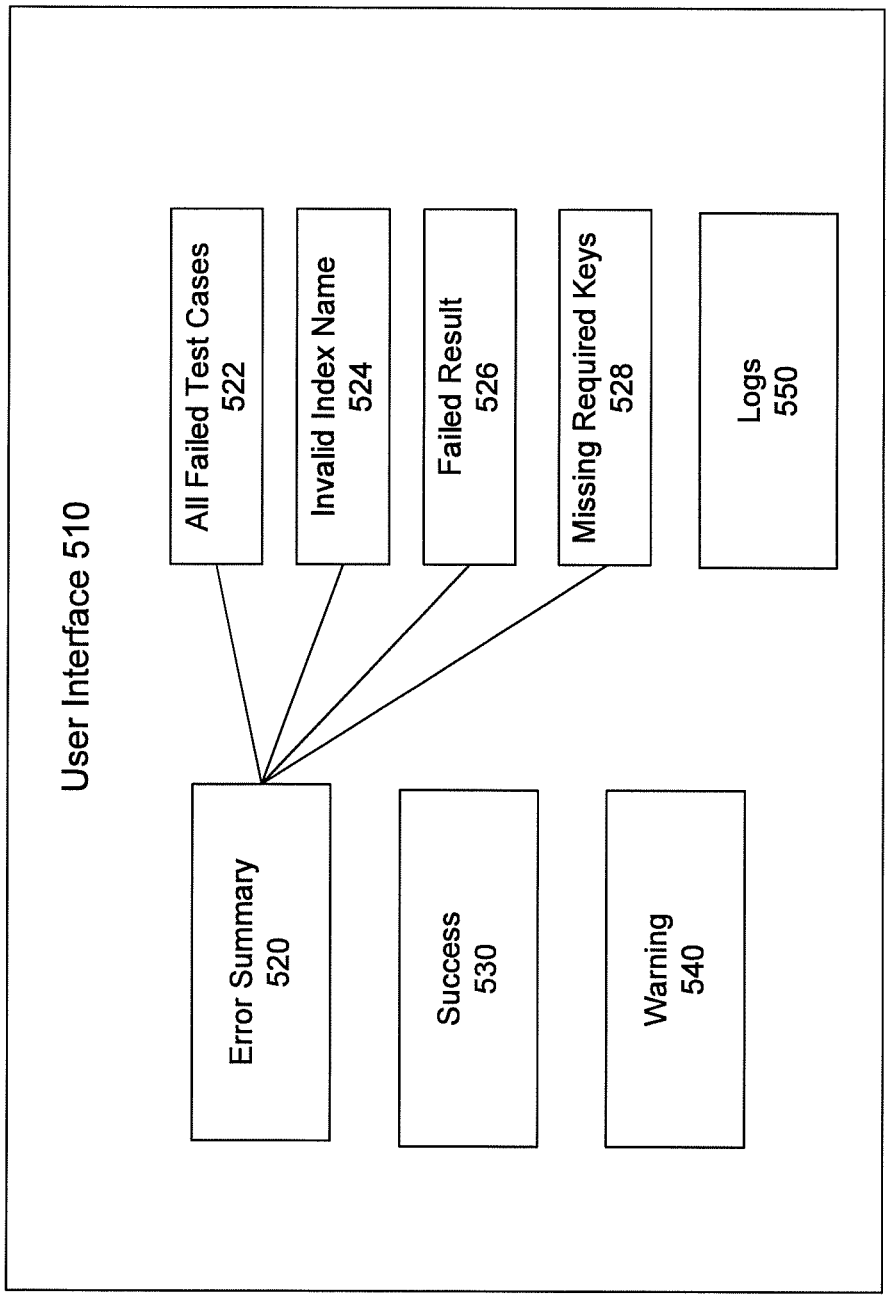
FIG. 5 is an exemplary illustration of an interactive interface of a Build Validation Engine, according to an embodiment of the present invention.

FIG. 5 is an exemplary illustration of an interactive interface of a Build Validation Engine, according to an embodiment of the present invention. User Interface 510 may include various interactive interfaces, including Error Summary 520, Success 530 and Warnings 540. Error Summary may include a range of notifications, including All Failed Test Cases 522, Invalid Index Name 524, Failed Result 526, and Missing Required Keys 528.

User Interface 510 may provide graphical icons that represent a successful build, a failure as well as other conditions. For example, a successful build may be represented by a green icon. In addition, User Interface 510 may provide access to run logs from a build package at 550. If, for example, a failure is determined, User Interface 510 may present a red icon. In this scenario, the build package itself may be deleted to avoid or prevent deployment to an environment. The user may then access logs to examine the errors and reasons for failure.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

While the exemplary embodiments described herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by a Processor may be stored and cataloged in a Database which may comprise or interface with a searchable database. The database may comprise, include or interface to a relational or non-relational database. Other databases, such as a query format database, a Standard Query Language (SQL) format database, a storage area network (SAN), or another similar data storage device, query format, platform or resource may be used. The database may comprise a single database or a collection of databases, dedicated or otherwise. In one embodiment, the database may store or cooperate with other databases to store the various data and information described herein. In some embodiments, the database may comprise a file management system, program or application for storing and maintaining data and information used or generated by the various features and functions of the systems and methods described herein. In some embodiments, the database may store, maintain and permit access to participant information, transaction information, account information, and general information used to process transactions as described herein. In some embodiments, the database is connected directly to the Processor, which, in some embodiments, it is accessible through a network, such as a communication network, for example.

Communications network may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network may comprise a satellite communications network, such as a direct broadcast communication system (DBS) having the requisite number of dishes, satellites and transmitter/receiver boxes, for example. Communications network may also comprise a telephone communications network, such as the Public Switched Telephone Network (PSTN). In another embodiment, communication network may comprise a Personal Branch Exchange (PBX), which may further connect to the PSTN.

In some embodiments, the processor may include any terminal (e.g., a typical personal computer system, telephone, personal digital assistant (PDA) or other like device) whereby a user may interact with a network, such as communications network, for example, that is responsible for transmitting and delivering data and information used by the various systems and methods described herein. The processor may include, for instance, a personal or laptop computer, a telephone, or PDA. The processor may include a microprocessor, a microcontroller or other general or special purpose device operating under programmed control. The processor may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. The processor may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). The processor may also include a network-enabled appliance, a browser-equipped or other network-enabled cellular telephone, or another TCP/IP client or other device.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

The embodiments of the present inventions are not to be limited in scope by the specific embodiments described herein. For example, although many of the embodiments disclosed herein have been described with reference to identifying events and communicating notification, the principles herein are equally applicable to other applications. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. A computer implemented system that implements a build validation engine, the system comprising:
one or more computer processors programmed to:
provide a real-time data interface that accesses a real-time data;
display an interactive user interface that displays build results via a communication network; and
execute a build validation engine, coupled to the real-time data interface and the interactive user interface, the build validation engine further configured to perform steps comprising:
receiving inputs from a software platform, the inputs comprising a build identifier and a mode indicator wherein the mode indicator comprises a test mode;
initiating, via the build validation engine, validation of a plurality of configuration file categories for a software build;
identifying and applying, via the build validation engine, a set of configuration rules, the set of configuration rules associated with each configuration file category and further comprising server class validation, inputs validation, indexes validation and props validation; and
determining whether a successful build is achieved and if a successful build is not determined, failing the build and deleting corresponding deployment bundles upon a determination that the system is not in the test mode.

2. The computer implemented system of claim 1, wherein the server class validation comprises validating invalid characters.

3. The computer implemented system of claim 1, wherein the server class validation comprises validating stanzas.

4. The computer implemented system of claim 1, wherein the server class validation comprises validating server class stanzas.

5. The computer implemented system of claim 1, wherein the inputs validation comprises validating keys and values stanzas.

6. The computer implemented system of claim 1, wherein the indexes validation comprises validating stanza name and format.

7. The computer implemented system of claim 1, wherein the props validation comprises validating stanza name and stanza keys and values.

8. The computer implemented system of claim 1, wherein the interactive user interface displays one or more build issues as a result of the validation.

9. The computer implemented system of claim 8, wherein the interactive user interface displays run logs from a build package.

10. A computer implemented method that implements a build validation engine, the method comprising the steps of:
receiving inputs from a software platform, the inputs comprising a build identifier and a mode indicator wherein the mode indicator comprises a test mode;
initiating, via a build validation engine, validation of a plurality of configuration file categories for a software build;
identifying and applying, via the build validation engine, a set of configuration rules, the set of configuration rules associated with each configuration file category and further comprising server class validation, inputs validation, indexes validation and props validation; and determining whether a successful build is achieved and if a successful build is not determined, failing the build and deleting corresponding deployment bundles upon a determination that the system is not in the test mode.

11. The computer implemented method of claim 10, wherein the server class validation comprises validating invalid characters.

12. The computer implemented method of claim 10, wherein the server class validation comprises validating stanzas.

13. The computer implemented method of claim 10, wherein the server class validation comprises validating server class stanzas.

14. The computer implemented method of claim 10, wherein the inputs validation comprises validating keys and values stanzas.

15. The computer implemented method of claim 10, wherein the indexes validation comprises validating stanza name and format.

16. The computer implemented method of claim 10, wherein the props validation comprises validating stanza name and stanza keys and values.

17. The computer implemented method of claim 10, wherein the interactive user interface displays one or more build issues as a result of the validation.

18. The computer implemented method of claim 17, wherein the interactive user interface displays run logs from a build package.

* * * * *